US010081156B2

(12) United States Patent
Tillery

(10) Patent No.: US 10,081,156 B2
(45) Date of Patent: *Sep. 25, 2018

(54) MOVEMENT-RESISTANT FLOOR MAT

(71) Applicant: MMI Andersen Company, LLC, Dalton, GA (US)

(72) Inventor: William Leon Tillery, Ringgold, GA (US)

(73) Assignee: M+A MATTING, LLC, LaGrange, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/440,594

(22) Filed: Feb. 23, 2017

(65) Prior Publication Data

US 2017/0182734 A1 Jun. 29, 2017

Related U.S. Application Data

(63) Continuation of application No. 14/605,517, filed on Jan. 26, 2015, now Pat. No. 9,609,971.

(51) Int. Cl.
*B32B 3/06* (2006.01)
*B32B 5/02* (2006.01)
*B32B 25/10* (2006.01)
*B32B 25/04* (2006.01)

(52) U.S. Cl.
CPC ............... *B32B 5/02* (2013.01); *B32B 25/04* (2013.01); *B32B 25/10* (2013.01); *B32B 2471/04* (2013.01)

(58) Field of Classification Search
CPC .............. Y10T 428/24182; B32B 3/06; A47G 27/0231; A47G 27/0206; A47L 23/266
See application file for complete search history.

(56) References Cited

U.S. PATENT DOCUMENTS

| 5,227,214 | A | 7/1993 | Kerr |
|---|---|---|---|
| 6,656,562 | B2 | 12/2003 | Malpass |
| 6,726,190 | B2 | 4/2004 | Malpass |
| 6,866,916 | B1 | 3/2005 | Malpass |
| 6,946,183 | B2 | 9/2005 | Malpass |
| 7,776,422 | B2 | 8/2010 | Alford |
| 2004/0229011 | A1 | 11/2004 | Robbins |
| 2005/0193669 | A1 | 9/2005 | Jenkins |
| 2008/0213537 | A1 | 9/2008 | Alford |
| 2014/0272278 | A1 | 9/2014 | Malpass |

OTHER PUBLICATIONS

Internationl Search Report, PCT/US2015/068220 (dated Mar. 31, 2016).
Written Opinion, PCT/US2015/068220 (dated Mar. 31, 2016).
Article 34 Letter, PCT/US2015/068220 (dated Oct. 13, 2016).

*Primary Examiner* — Alexander Thomas
(74) *Attorney, Agent, or Firm* — Baker Donelson; Carl M. Davis, II

(57) ABSTRACT

A floor mat made of a rubber sheet having a top surface and a bottom surface with spaced-apart lugs extending therefrom, each lug having a pair of opposing nibs spaced-apart to define a passage therebetween with a longitudinal axis in a selected direction and the selected direction different from the direction of the longitudinal axis of the passage in an adjacent lug, which lugs cooperatively resist movement of the mat in response to loading by foot and wheeled cart traffic across the floor mat disposed on a floor surface.

26 Claims, 6 Drawing Sheets

Mat Layout For Placement Stability Testing (4) 3 Foot x 5 Foot Test Mats

Distance 122 greater than the wheel base length of cart.

Arrow 120 depicts cart travel direction and pile direction of mat fabric.

MOVEMENT-RESISTANT FLOOR MAT

This application is a continuation of U.S. patent application Ser. No. 14/605,517, filed Jan. 26, 2015, issued Apr. 4, 2017, as U.S. Pat. No. 9,609,971.

TECHNICAL FIELD

The present invention relates to floor mats. More particularly, the present invention relates to floor mats having a bottom surface with structural features that resist movement of the floor mat during use in foot and wheeled cart traffic areas.

BACKGROUND OF THE INVENTION

Commercial businesses, processing facilities, manufacturers, and homes often place floor mats at entrances and on aisle ways. The floor mats generally have a backing surface to bear against a floor surface and an opposing top surface for foot or wheeled traffic. The top surface may be molded or include a fabric or carpet for scraping debris from shoes and receiving and holding such dislodged debris. The floor mat may thus capture at least some of the dirt and debris that may otherwise be carried into a floor space and become dislodged there. The uncaptured dirt and debris that dislodges after being carried into a floor space increases cleaning maintenance requirements and may lead to slip and falls by persons using the floor space.

Grocery stores often have problems arising with floor surfaces and traffic of persons walking on the floor surface and moving wheeled carts across the floor surfaces. By way of example, grocery stores typically group particular like products in departments or areas for selection during purchasing. These groupings, or departments, include fresh produce of vegetables and fruits, meats, canned goods, dairy, breads, and the like. The grouping of products in departments not only make shopping more convenient but groups specialized equipment necessary for inventory storage and display of the goods in the respective departments. For example, the meat department includes refrigerated cases for display of meat. The produce department includes sprayers for misting vegetables and fruits with water spray. The dairy department includes typically open refrigerated cases for maintaining the product at lower temperatures while providing convenient access for shoppers to the products.

Some departments are susceptible to moisture on the floor. This includes the produce and meats department. In addition, other commercial facilities are similarly subject to moisture on the floor. Persons working in these grocery departments often spend time walking through the department to respond to customer requests, to replenish inventory, and to straighten display of product in the department.

Often these departments place commercial rubber-backed carpeted floor mats on the floors. As noted above, these commercial mats typically have flat or substantially planar backs or have small spaced-apart spikes that extend from the back of the mat. The mats have an opposing carpet face on which persons walk or roll shopping carts. The spikes bear against the floor. The floor mats provide a softer walking surface as well as reduce the potential for customers to walk on a wet floor surface. Indeed, an industry has developed around the periodic placing, retrieval, and cleaning of such carpeted floor mats in grocery stores and other commercial establishments.

Notwithstanding, there are drawbacks to the use of currently available floor mats. These floor mats typically are placed on firm surfaces. The floor mats are subject to foot and wheeled cart traffic, which is the purpose. Persons walk across the mats and roll shopping carts across the mats. The loading of the traffic tends to cause the floor mat to "walk" or move slightly as the traffic moves across the mat. The spikes projecting on the back surface provide support but also are provided as a structure to resist the mat from "creeping" or moving in response to the loading of the person walking or rolling a cart across the mat. Generally, a floor mat with a flat back does not move as much as one having the spikes. A greater surface areas provides increased friction to the floor to resist movement. The spikes on the other hand may flex under loading such as by a customer walking on the carpeted surface. The flex and return movement of the spikes tends to cause the floor mat to move. The mats with spikes generally work best on carpeted or textured floors. The movement or "walking" of the floor mat from any one incident generally is not significant, but multiple occurrences of walking across the mat by customers or multiple occurrences of carts rolling across the mat may causes significant movement from the original placement of the floor mat.

Accordingly, there is a need in the art for floor mats with an surface structure that provides improved resistant to movement of the floor mat during use by foot or wheeled traffic. It is to such that the present invention is directed.

SUMMARY OF THE INVENTION

The present invention meets the needs in the art by providing a floor mat having a backing surface structure that provides improved resistant to movement of the floor mat during use by foot or wheeled traffic. The present invention provides a floor mat comprising a sheet having a first side and an opposing second side for disposing on a surface, the second side defining a plurality of spaced-apart lugs extending from the second side, each lug comprising a pair of opposing C-shaped nibs that each have a free distal end for disposing on a surface, the nibs of the pair spaced-apart to define a passage therebetween with a longitudinal axis in a selected direction of a plurality of directions, said selected direction different from the direction of the longitudinal axis of the passage in an adjacent lug.

The floor mat as recited above, wherein a first nib of the pair of nibs has a first directional characteristic and a second nib of the pair of nibs has a second directional characteristic opposing the first directional characteristic.

The floor mat as recited above, wherein each nib has a concave face and the nibs are disposed to have the concave face in facing opposing relation to the opposing lug.

In another aspect, the present invention provides a floor mat, comprising a sheet having a first side and an opposing second side and a plurality of spaced-apart sets of a plurality of lugs longitudinally aligned and spaced-apart extending from the second side. Each lug comprises a first and second nib spaced-apart to define a passage therebetween with a longitudinal axis in a selected direction of a plurality of directions and said selected direction different from the direction of the longitudinal axis of the passage in an adjacent lug, and each nib has a free distal end for bearing against a surface. The mat, being loaded relative to the surface, transfers loading forces to at least some of the plurality of lugs and a displacing movement of one lug relative to the surface in a movement direction is cooperatively resisted by at least lugs in adjacent sets induced by respective loading to move in respective other directions, so that the mat resists movement.

The floor mat as recited above, wherein the first nib has a first directional characteristic and the second nib has a second directional characteristic opposing, the first directional characteristic.

The floor mat as recited above, wherein the lugs are C-shaped. Further, each nib has a concave face and the nibs are disposed to have the concave face in facing opposing relation to the opposing lug.

The floor mat as recited above, wherein the sheet is rubber. The floor mat further comprising a fiber layer laminated to the first side of the sheet.

The floor mat as recited above, wherein said selected direction of a first lug in the first set has a first direction and said selected direction of a first lug in the second set has a second direction different from the first direction.

In another aspect, the present invention provides a floor mat, comprising a sheet having a first side and an opposing second side and a plurality of spaced-apart sets of a plurality of lugs longitudinally aligned and spaced-apart, the lugs extending from the second side. Each lug comprises a first and second nib spaced-apart to define a passage therebetween with a longitudinal axis in a selected direction of a plurality of directions and said selected direction different from the direction of the longitudinal axis of the passage in lugs in an adjacent set of lugs. Each nib having a free distal end for bearing against a surface. The mat, being loaded relative to the surface, transfers loading forces to at least some of the plurality of lugs and a displacing movement of one lug relative to the surface in a movement direction is cooperatively resisted by at least lugs in adjacent sets induced by respective loading to move in respective other directions, so that the mat resists movement.

The floor mat as recited above, wherein the first nib has a first directional characteristic and the second nib has a second directional characteristic opposing the first directional characteristic.

The floor mat as recited above, wherein the lugs are C-shaped. Further, each nib has a concave face and the nibs are disposed to have the concave face in facing opposing relation to the opposing lug.

The floor mat as recited above, wherein the sheet is rubber. The floor mat further comprising a fiber layer laminated to the first side of the sheet.

Objects, advantages and features of the present invention will become apparent from a reading of the following detailed description of the invention and claims in view of the appended drawings.

DETAILED DESCRIPTION

Figure 1:
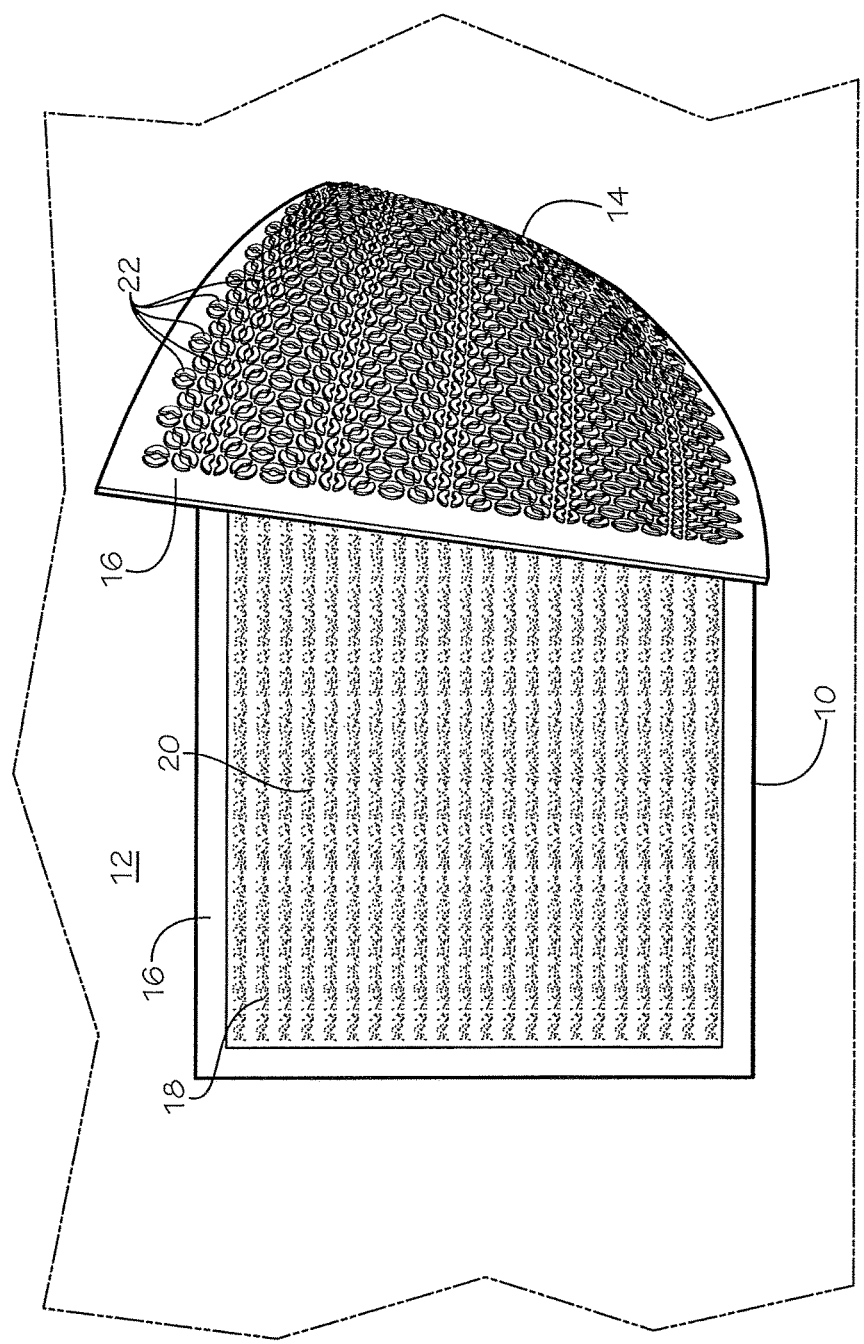
FIG. 1 illustrates in perspective view a movement-resistant floor mat according to the present invention.

Referring now in more detail to the drawings in which like parts have like identifiers, FIG. 1 illustrates in perspective view a movement-resistant floor mat 10 according to the present invention placed on a floor surface 12 and a portion of the floor mat folded over to illustrate a bottom surface 14. The floor mat 10 may include a border 16. The illustrated embodiment includes as an upper surface 18 a fiber layer or carpet 20. In an alternate embodiment, the mat 10 may be a single rubber layer with a molded upper surface. The bottom surface 14 provides a backing for the mat 10, and includes a plurality of structures or lugs 22 that project from the back surface of the mat. The lugs 22 bear against the floor and cooperatively resist movement of the floor mat 10 during use of the mat in foot and wheeled cart traffic areas, as discussed below.

Figure 2:
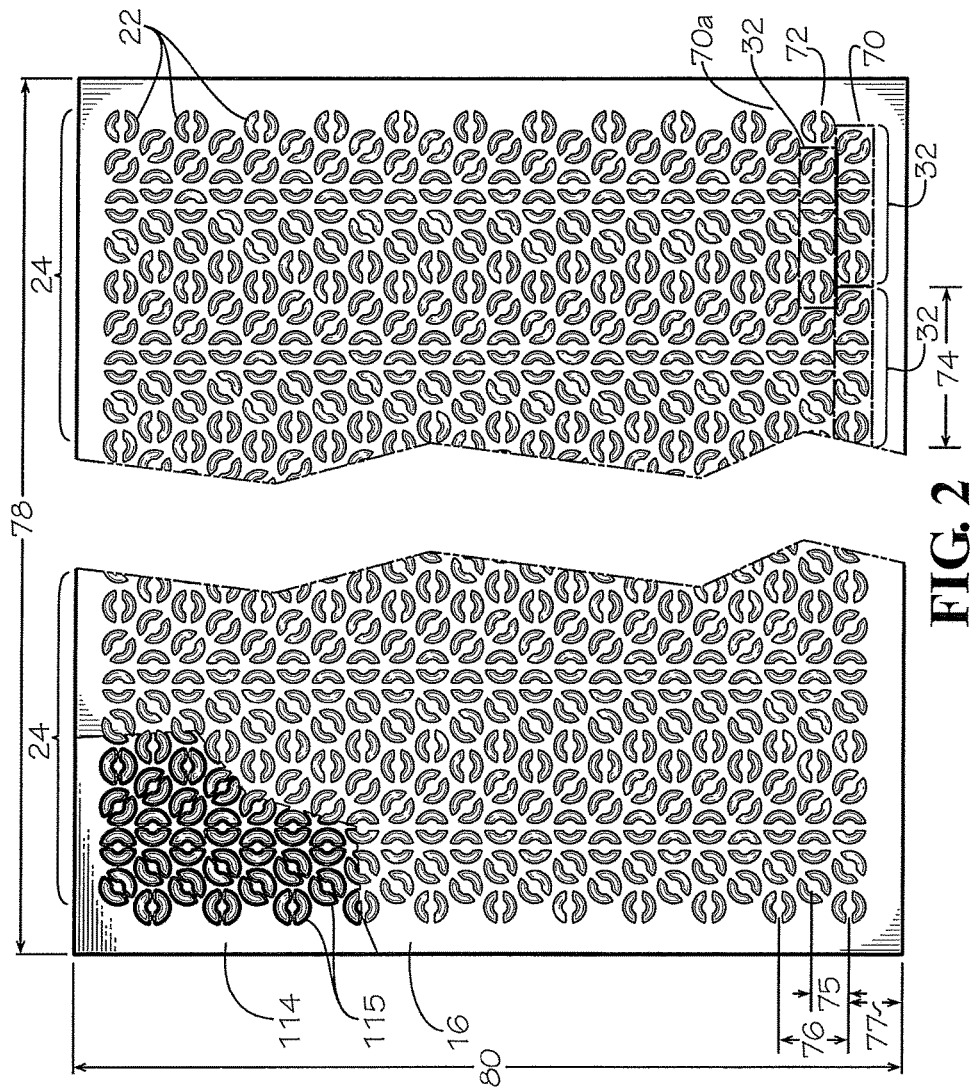
FIG. 2 illustrates in plan view an embodiment of a backing structure for the floor mat illustrated in FIG. 1.
Figure 3:
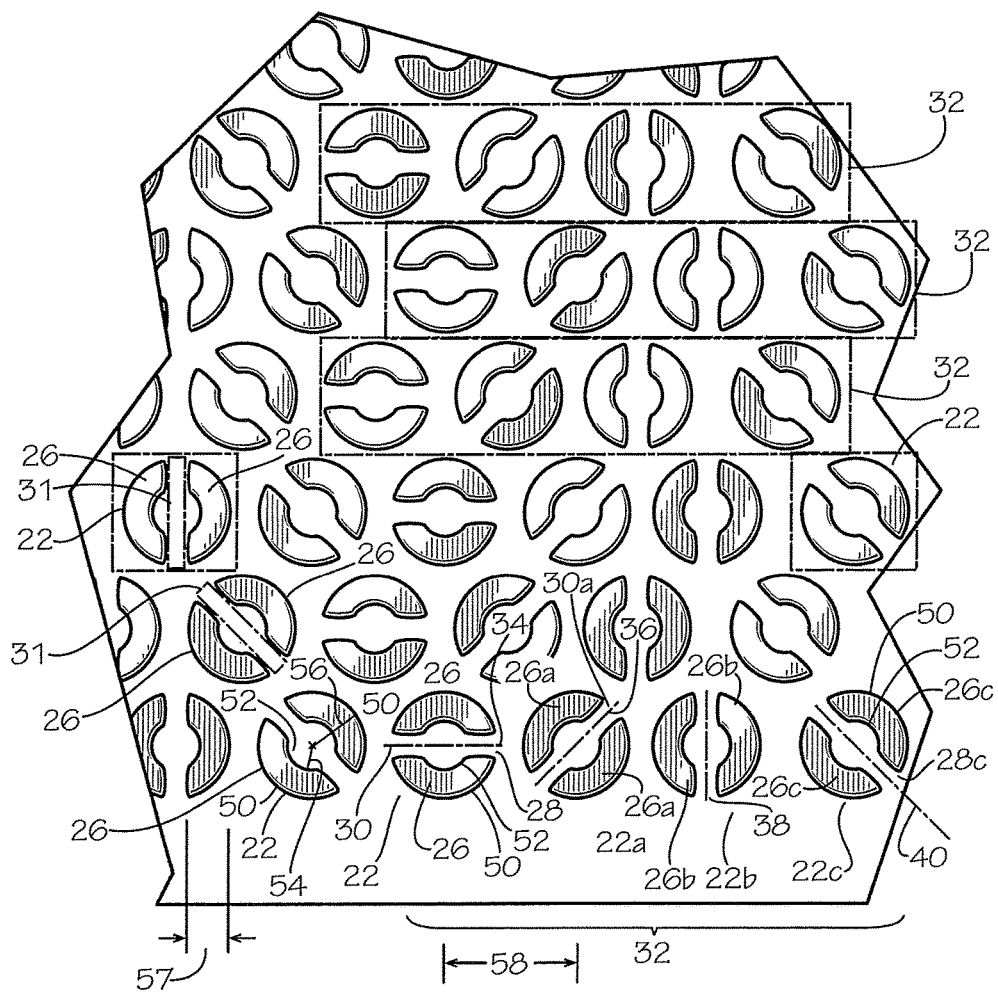
FIG. 3 illustrates a detailed plan view of the backing structure for a floor mat in accordance with the present invention.

FIG. 2 illustrates in plan view the structure of the bottom surface 14 for the floor mat 10 and a cut-away illustrating a die 114 for molding the bottom surface structure. The bottom surface structure includes a field generally 24 of the spaced-apart lugs 22. FIG. 3 illustrates in a detailed plan view features of the backing structure for the floor mat 10. Each lug 22 includes a pair of opposing geometric nibs 26. The nibs 26 extend from the bottom surface and each nib has a free distal end for disposing on the floor 12. In the illustrated embodiment, the nibs 26 extend 0.0625 inches outwardly of the bottom surface to the distal end. The lug 22 further includes a passage 28 defined by the spaced-apart opposing pair of nibs 26. A longitudinal axis 30 of the passage 28 extends in a first selected direction. The spaced-apart nibs 26 integral with the backing of the mat define in situ a bar 31 in the backing between the nibs. A longitudinal axis of the bar 31 is parallel to the longitudinal axis 30.

In the application of the present invention, an adjacent lug 22a is oriented to dispose the longitudinal axis 30a of its passage 28a at a second direction different from the first direction. The respective bar 31 thus is disposed at an intersecting angle relative to the bar of the adjacent lug 22. The lugs 22 are disposed in spaced-relation such that the passage 28 of a respective lug is free of a portion of the passage 28 of an adjacent lug. As illustrated in FIG. 3, the lugs 22 are disposed in spaced-relation such that the passage 28 of a respective lug is free of a portion of the passage 28 of an adjacent lug.

The embodiment illustrated in FIG. 3 provides a set generally 32 of lugs 22 in which the longitudinal axis 30 of the sequential lugs differs by 45°. Thus, for example, the nibs 26 in the first lug 22 define the passage 28 with the longitudinal axis on a line 34 oriented at 0°; the nibs 26a in an adjacent second lug 22a defines the passage with a longitudinal axis on a line 36 oriented at 45°; the nibs 26b in a third lug 22b define the passage with a longitudinal axis on a line 38 oriented at 90°; and the nibs 26c in a fourth lug 22c define the passage with a longitudinal axis on a line 40 oriented at 135°. It may be appreciated that other embodiments may have different number of sequential lugs; for example, orientations of the passages 28 differing by 30° have a series of five lugs 22. In other alternate embodiments, the orientations may differ by differing degrees.

The geometric nibs 26 in the illustrated embodiment are defined as C-shape members. Each member has a convex face 50 and an opposing concave face 52. The pair of nibs 26 are disposed in opposing relation with a respective concave face open towards the opposing respective concave face. With reference to FIG. 3, a radial line extending from a center point of one of the pair of nibs intersects a center point of the opposing one of the nibs. The first nib 26 in the lug defines a first directional characteristic and the second nib defines a second directional characteristic opposing the first directional characteristic. The directional characteristic is the tendency of the nib under loading to flex more easily in a direction normal to the passage 28 and less easily in a direction parallel to the passage. Under loading normal to the passage, one nib 26 tends to flex towards the passage while the opposing nib tends to flex away from the passage. It is believed that the bars 31 also cooperatively provide resistance to flexing of the nibs 26.

In an alternate embodiment (not illustrated), the convex face 50 defining an outer diameter of the nib 26 may further define a notch intermediate opposing distal ends of the nib, for example, a notch or groove defined at an apex of the face 50. The notch extends from the distal end of the nib 26 to the backing surface.

In the illustrated embodiment, the concave faces 52 are disposed on first radius 54 and the convex faces 50 are disposed on a second radius 56. The nibs 26 thereby define arcuate segments of a ring defined by first and second concentric circles. An exemplary embodiment has the first radius 54 of 0.09765 inches (or a diameter of 0.1953 inches) and the second radius 56 of 0.1953 inches (or a diameter of 0.3906 inches). The width 57 of the nib 26 between the concave face 52 and the convex face 50 is 0.09765 inches. Further, the lugs 22 in the set 32 are spaced 58 on 0.4883 inch centers. Other geometric members having directional characteristics may be gainfully employed.

With continuing reference to FIG. 2, the field 24 includes alternating first and second lines 70, 72 of repeating sets 32 of the lugs 22. The first lug 22 in the line 70 has a selected one of the plurality of directions for orientation of the passage 28 in the lug; the first lug 22 in the line 72 has a second selected one of the plurality of directions for orientation of the respective passage 28. Further, the lugs 22 in the first line 70 having the same orientation as lugs in the second line 72 may be off-set relative to each other. In the illustrated embodiment, the lugs in the first and second lines 40, 42 are off-set 45°. The sets 32 of lugs in each line 70, 72 are disposed longitudinally 74 on 1.9531 inch centers. Adjacent lines 70, 72 are spaced laterally 75 on 0.4229 inch centers; alternating lines 70, 70a (72, 72a) are spaced laterally 76 on 0.8458 inch centers.

The mat 10 in the illustrated embodiment includes a perimeter boarder 16. In the illustrated embodiment, the width 77 of the border 16 between an edge of the mat 10 and a line defined by a closest edge of the lugs 22 is 0.375 inches. The illustrated embodiment of the mat 10 defines a tile having a length 78 of 10.681 inches and a width 80 of 10.0526 inches; other widths and lengths may be used, for example and non-limiting, mats of conventional area such as 3 feet×5 feet, 3 feet×6 feet, 3 feet×10 feet, 4 feet×6 feet, and 4 feet×10 feet.

FIG. 2 further illustrates in cut-away view a portion of the die 114 that defines a plurality of openings 115. As discussed below, a moldable sheet 116 overlies the die 114 and during molding, portions of the material of the sheet 116 fill the openings 115 to define the nibs 26.

Figure 4:
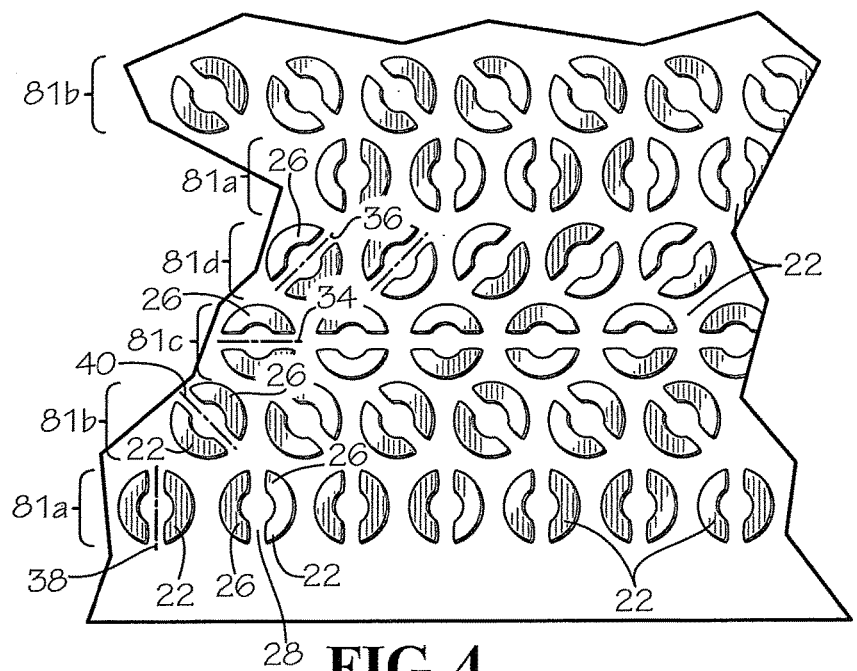
FIG. 4 illustrates a detailed plan view of an alternate embodiment of the backing structure for a floor mat in accordance with the present invention.

FIG. 4 illustrates a detailed plan view of an alternate embodiment 81 of the backing structure for the floor mat 10 in accordance with the present invention. This embodiment uses repeating sets of four spaced apart lines 81a-81d each having lugs 22. In this embodiment, the nibs 26 in each lug 22 in the respective line 81a-81d defines the passage 28 at the same orientation. Thus, the passages 28 of the lugs 22 in the line 81a are oriented at a first direction; the passages 28 of the lugs 22 in the line 81b are oriented at a second direction; the passages 28 of the lugs 22 in the line 81c are oriented at a third direction; and the passages 28 of the lugs 22 in the line 81d are oriented at a fourth direction. Other embodiments have orientation of passages 28 at a different degrees and thus may have additional (or fewer) lines 81 of lugs for based on the selected orientation difference for the passages 28.

Figure 5:
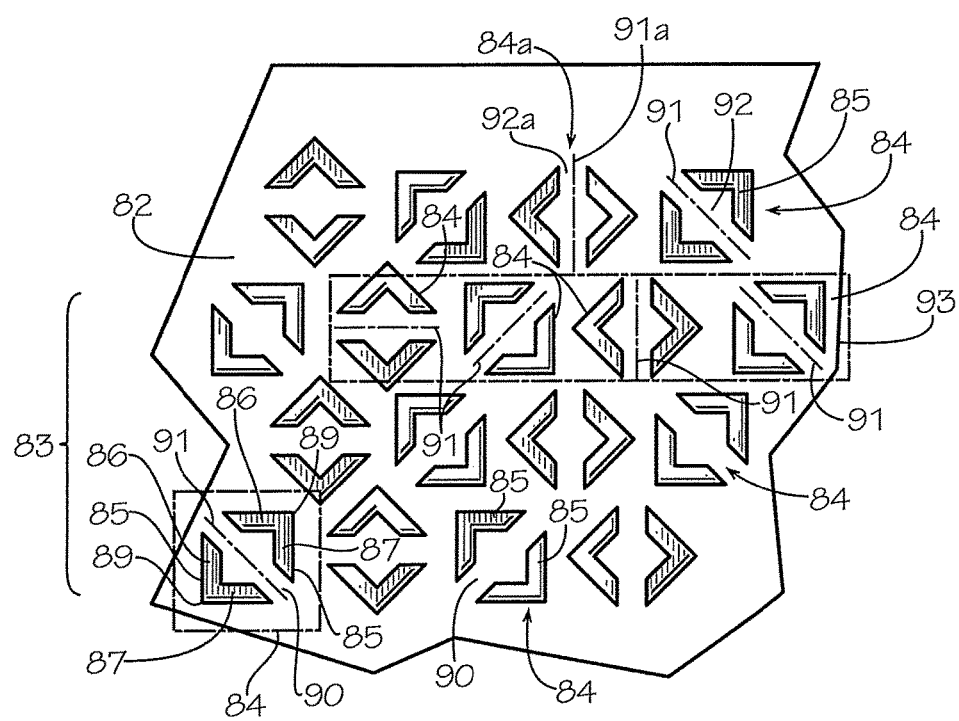
FIG. 5 illustrates a detailed plan view of an alternate embodiment of the backing structure for a floor mat in accordance with the present invention.

As noted above, the backing surface has a field of geometric members with directional characteristics. FIG. 5 illustrates a detailed plan view of a portion of an alternate embodiment 82 of the backing structure for the floor mat 10 in accordance with the present invention. The structure includes a field generally 83 of a plurality of spaced-apart lugs 84. Each lug 84 includes a pair of opposing geometric nibs 85. The geometric nibs 85 define a substantially V-shape member projecting from the bottom surface. The nib 85 has a first leg 86 and a second leg 87 that extend from an apex 89. This defines a face 88 that is open to the face of the opposing nib 85 in the lug 84. The angled relation of the legs 86, 87 define the respective opposing directional characteristics of the opposing nibs 85. That is, a nib 85 "points" in a first direction; the opposing nib "points" in a second direction. The opposing nibs 85 tend to flex bendingly under load in different directions. Each nib 85 has a free distal end for disposing on the floor 12. In the illustrated embodiment, the nibs 85 extend 0.0625 inches outwardly of the bottom surface to the distal end. The lug 84 further includes a passage 90 defined by the spaced-apart opposing pair of nibs 85. A longitudinal axis 91 of the passage 90 extends in a first selected direction. The nibs 85 integral with the backing of the mat define a bar 92 in the backing between the nibs. A longitudinal axis of the bar 92 is parallel to the longitudinal axis 91.

An adjacent lug 84a is oriented to dispose the longitudinal axis 92a of its passage 90a at a second direction different from the first direction. The respective bar 92a thus is disposed at an intersecting angle relative to the bar 92 of the adjacent lug 84. The embodiment illustrated in FIG. 5 provides a set generally 93 of lugs 84 in which the longitudinal axis 91 of the passage 90 in sequential lugs differs by 45°.

Figure 6:
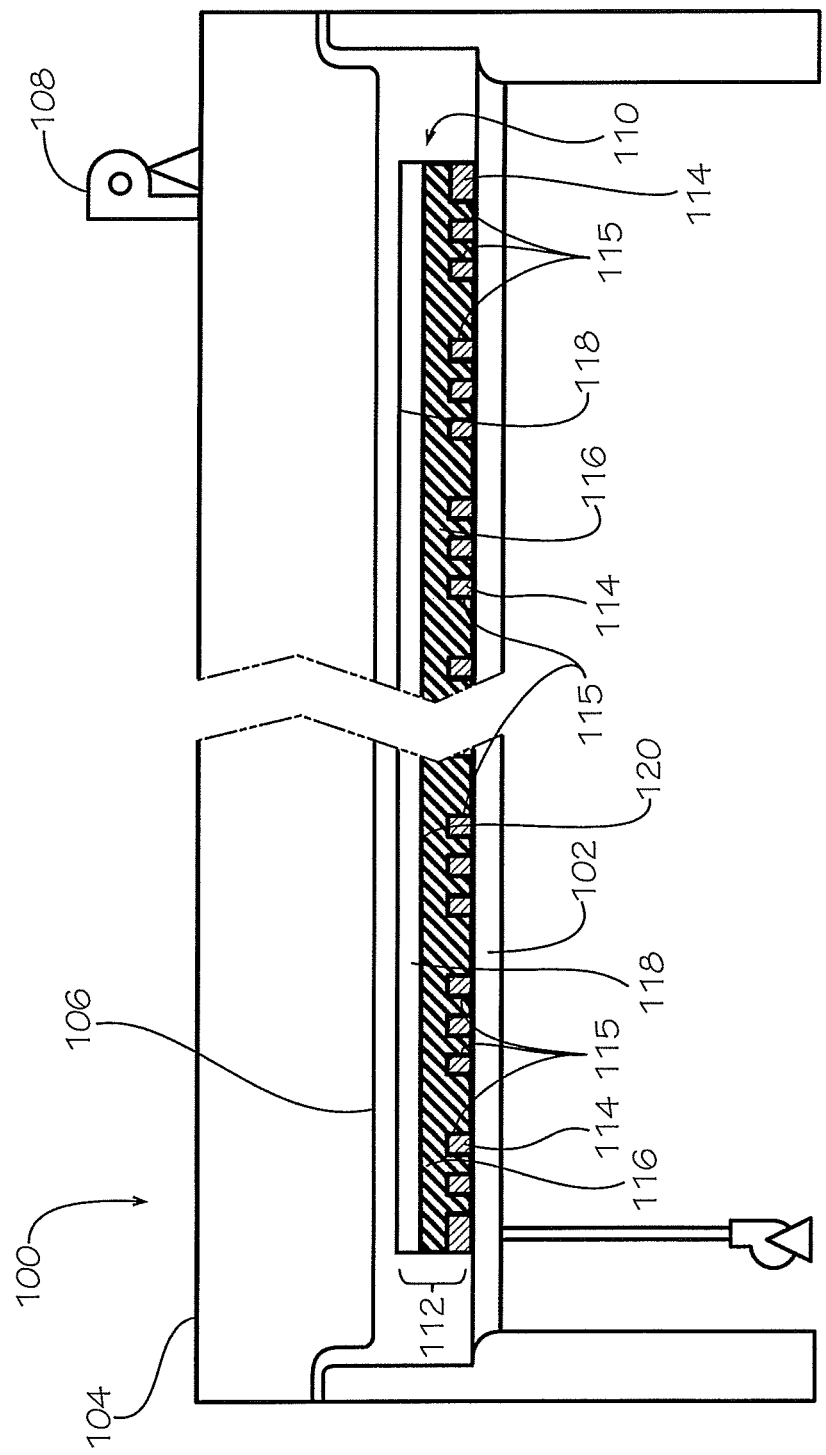
FIG. 6 illustrates a side cross-sectional view of a lamination press for making the floor mat illustrated in FIG. 1.

FIG. 6 illustrates a side cross-sectional view of a lamination press 100 for making floor mat 10. Lamination presses are well-known in the art, but briefly the lamination press 100 includes a platen 102 that is closed by a cover 104 having an air bladder 106 moved forcibly by pressurized air communicated through an air valve assembly 108 against articles held on the platen for lamination purposes. The platen 102 and the cover 104 define a cavity generally 110 for receiving a mold stack 112 of the die 114 (also illustrated in cut-away view in FIG. 2) and at least the moldable material sheet 116. The moldable sheet 116 may be rubber curable by vulcanization. The die 114 defines the plurality of openings 115 that correspond in shape and spacing to the geometric nibs 26 of the lugs 22. In the illustrated embodiment, the die is a steel sheet of 0.0625 inches. The sheet 116 overlies the die 114. In an illustrative embodiment, the sheet 116 is an uncured rubber material. For the mat 10 illustrated in FIG. 1, a carpet sheet 118 may be positioned with a base 119 of the carpet on the sheet 116 and the yarn-face of the carpet outward of the sheet.

The lamination press 100 operates to heat the platen 102 to soften the sheet 116 and initiate the vulcanization process to cure the rubber material. Pressurized air from the air valve assembly 108 pressurizes the air bladder 106. The air bladder 106, being pressurized, elastically applies force against the stack 112. The loading against the stack 112 forces portions of the softened sheet 116 into the openings of the die 114. The rubber material flows sufficiently to engage the carpet base 119 and to flow into the openings in the die 114 and thereby define the nibs 26 of the lugs 22. Appropriate time and temperature vulcanizes the rubber sheet 116. The floor mat 10 is thereby provided with the nibs 26 of the lugs 22, which in use on the floor surface 12 flex against the floor surface in response to the foot and wheeled cart traffic, to cooperatively resist movement of the floor mat.

With reference to FIG. 1, the floor mat 10 is gainfully used to cover floor surfaces 12, particularly in areas that experience high frequency foot and wheeled cart traffic, such as entrances, aisle ways, passageways, work stations, waiting areas and other places of traffic. The floor mat 10 is placed bottom surface 14 down against the floor 12. The border 16 and the lugs 22 support the floor mat 10. As persons walk over the floor mat 10, or move wheeled carts such as grocery carts (not illustrated) over the upper surface of the mat, the floor mat experiences downward and longitudinal loading.

The mat 10 transfers the loading through at least some of the nibs 26 to the floor. The loaded nibs 26 respond by flexing downward and in the direction of the longitudinal loading. The loaded and flexing nib thereby attempts to move relative to the surface 12. However, the adjacent lugs 22 proximate the loaded nib 26 cooperatively resist the relative movement, as such adjacent nibs 26 are likewise loaded and induced to flex on a respective vector. The inter-cooperation of the lugs 22 having passages 28 oriented on differing axis and being loaded as well, resists the tendency of the floor mat to move relative to the surface in response to the traffic using the floor mat.

The mat 10, being loaded relative to the surface 12, transfers loading forces to at least some of the plurality of lugs 22. A displacing movement of one lug relative to the floor surface in a movement direction is cooperatively resisted by at least the lugs in adjacent sets 32 which lugs are likewise induced by the loading to move in respective other directions. The mat 10 thereby resists the tendency to "walk" or move slightly in response to the loading movement of the person or the wheeled cart using the mat. It is contemplated that the bars 31 also assist cooperatively with the resistance to movement.

Accordingly, the floor mat 10 in situ grips the floor surface 12 with the spaced-apart lugs 22 while in use for foot and wheeled cart traffic and the lugs resist movement or walking of the floor mat from its placement.

The geometric members illustrated in FIG. 5 as nibs 85 similarly flex downwardly under loading transferred through the mat 10 to the floor. The adjacent lugs 84 cooperatively resist relative movement of the mat 10.

Shopping Cart Placement Stability Testing

Tests were conducted of mats including one mat having a backing structure in accordance with the present invention to provide a comparative evaluation of the tendency of a mat to creep or move in response to foot or wheeled traffic. The vinyl floor surface used in each test was not freshly waxed nor were new tiles that define the floors. The test was conducted in such a way as to fairly compare various mats on as even terms as practically possible.

Floor: Vinyl tile
Cart Content Weight: 50 pounds
Mats Tested (3 Foot by 5 Foot Mats)
WATERHOG mat with lugs 22 pattern/medium brown
WATERHOG mat with universal cleat pattern/medium brown (projecting cylindrical cleats—0.0625 inches long)
WATERHOG mat with smooth back pattern
CLASSIC SOLUTIONS mat 90-mil smooth back pattern/slate gray (washed twice)

Test Sequence

Figure 7:
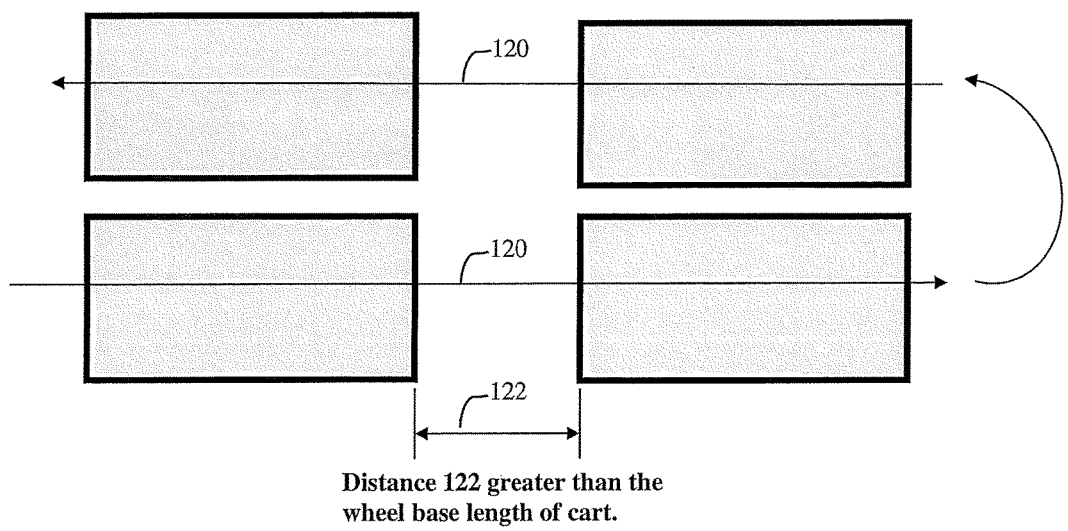
FIG. 7 illustrates placement of mats and direction of travel of a wheeled cart in tests for mat movement.

FIG. 7 illustrates the sequence of the four mats and the travel path of the weighted cart during the test. An arrow 120 indicates the travel direction and pile direction of the mat fabric. A distance 122 between adjacent test mats is greater than the wheel base length of the cart. The test involved passing the weighted shopping cart in one direction over each test mat 100 times. The total movement from original positioning was measured at the end of the test.

Vinyl Floor Conditions for Tests
Clean, waxed
Damp
Sandy

"Clean, waxed" (vinyl tile) refers to flooring that has been freshly swept and mopped, and recently waxed (that is, a having a wax coating that is still viable).

"Damp" refers to "damp mopped". Excess water is squeezed from a mop that is then applied to the floor as uniformly as possible. Once a given mat-sized floor area is mopped, the mat is immediately placed to trap the moisture on the floor area beneath the mat and prevent rapid evaporation.

"Sandy" floor refers to floor areas having 2 grams of fine sand per 15 square feet of test area, with the sand applied as evenly as possibly over an area approximately the same size as the mats being tested.

The test involves pushing a wheeled shopping cart holding a 50 pound weight longitudinally across the mats. The mats in the test were placed as illustrated in FIG. 7. The pile direction of each mat being tested are uniform. The mats are spaced far enough apart that the cart will completely traverse one mat before starting across another. All mats are equally tamped prior to testing. The carts are manually pushed at an even pace.

Table 1 below presents the measured results of the movement (inches) for each mat in each of the tests. It may be appreciated that the mat having lugs in accordance the present invention better resisted movement that the comparative mats.

| Floor Condition | CLASSIC SOLUTIONS Mat | WATERHOG Mat (smooth) | WATERHOG Mat (Universal cleat pattern) | WATERHOG Mat (lugs 22 in accordance with the illustrated embodiment) |
|---|---|---|---|---|
| Clean, waxed floor | 7.60 | 8.27 | 30.00 | 0.00 |
| Damp Floor | 8.82 | 6.61 | 22.68 | 1.42 |
| Sandy Floor | 33.74 | 12.60 | 49.61 | 0.00 |

Test For Measured Displacement (or Creep) (inches)

TABLE OF REFERENCE NUMERALS 10 movement-resistant floor mat
12 floor surface 14 bottom surface of mat 10
16 border of mat 10
18 upper surface of mat 10
20 carpet (in upper surface of mat 10)
22 lug
24 field of lugs 22 on bottom surface 14
26 nib (pair of nibs 26 in a lug 22)
28 passage (defined by spaced-apart nibs 26 in a lug 22)
30 longitudinal axis of passage 28
31 bar in mat 10 defined by spaced-apart nibs 26
32 set of lugs 2 (the sequence of lugs 22 differing by orientation of the passage 28; illustrated embodiment has four lugs 22 in each set 32)
34 orientation line for passage 28 in lug 22
36 orientation line for passage 28a in lug 22a
38 orientation line for passage 28b in lug 22b
40 orientation line for passage 28c in lug 22c
50 convex face of C-shaped nib 22
52 concave face of C-shaped nib 22
54 first radius of lug 22
56 second radius of lug 22
57 width of nib 22 between radius 54 and radius 56
58 spacing of lugs 22 in set 32
70 first line of repeating sets 32 of lugs 22
72 second line of repeating sets 32 of lugs 22 lines 70, 72 alternate and are offset relative to each other in the field 24 in the illustrated embodiment of the mat 10
74 longitudinal spacing of sets 32 of lugs in the lines 70, 72
75 lateral spacing of adjacent lines 70, 72
76 lateral spacing of alternating lines 70 or 72
77 width of border 16 of the mat 10
78 length of illustrated mat 10 (tile)
80 width of illustrated mat 10 (tile)
81 alternate embodiment (in which a line of lugs 22 have same orientation of passage 28 and adjacent line has lugs 22 with different orientation of the passages 28)
81a first line of lugs 22 in alternate embodiment mat 81
81B second line of lugs in alternate embodiment mat 81
81a third line of lugs in alternate embodiment mat 81
81a fourth line of lugs in alternate embodiment mat 81
82 alternate embodiment of backing structure of mat 10
83 field of lugs 84
84 a plurality of lugs
85 geometric nibs in each lug
86 first leg of nib 85
87 second leg of nib 85
90 passage
91 longitudinal axis of passage 90
92 bar integral with backing
93 set of lugs 84
100 lamination press
102 platen
104 cover
106 air bladder
108 air valve assembly
110 cavity for receiving mold stack 112
112 mold stack
114 die
116 sheet
118 carpet sheet
119 base of carpet
120 air showing direction of cart in test
122 spacing between mats in tests It is thus seen that an improved floor mat is provided for resisting the tendency of floor mats to "walk" or move in response to loading from foot and wheeled cart traffic, together with a method for manufacturing such floor mats.

While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, many modifications, variations and changes may be made by those skilled in the art without departure from the spirit and scope of the invention as described by the following claims.

What is claimed is:

1. A floor mat that resists mat creep movement during use for mat purposes, comprising:
   a rubber sheet having a first side and an opposing second side for disposing on a floor surface for mat purposes,
   the second side defining a plurality of spaced-apart lugs extending in spaced-apart rows from the second side,
   each lug comprising a pair of opposing C-shaped nibs,
   each nib having a planar free distal end in a plane parallel to a surface of the second side for load-bearing contact with the floor surface,
   the pair of nibs disposed in spaced-apart relation with a respective concave face open towards the opposing respective concave face such that a radial line extending from a center point of one of the pair of nibs intersects a center point of the opposing one of the ribs and
   a passage therebetween with a longitudinal axis in a selected direction of a plurality of directions to define a respective directional characteristic of the lug,
   the lugs in a respective row spaced apart such that the passage defined by a respective lug is free of a portion of the passage of an adjacent lug,
   said selected direction different from the direction of the longitudinal axis of the passage in an adjacent lug, and
   having a directional characteristic different from said adjacent lug,
   the opposing different directional characteristics cooperatively resisting creep movement of the mat under loading imposed on the mat being used for mat purposes on the floor surface.

2. The floor mat as recited in claim 1, further comprising a fiber layer laminated to the first side of the sheet.

3. The floor mat as recited in claim 1, wherein the concave face is defined by a first radius and the convex face is define by a second radius.

4. The floor mat as recited in claim 3, wherein the first radius is about 0.09765 inches and the second radius is about 0.1953 inches and adjacent lugs are spaced on about 0.4883 inch centers.

5. The floor mat as recited in claim 1, wherein the nibs extend about 0.0625 inches from the second side of the sheet.

6. The floor mat as recited in claim 1, wherein a first row of the lugs is laterally offset relative to a second adjacent row of the lugs.

7. The floor mat as recited in claim 1, wherein the directions in the plurality of directions differ sequentially by a preselected number of degrees, whereby the selected direction of a respective one of the lugs differs by the preselected number of degrees from the selected direction of an adjacent lug.

8. The floor mat as recited in claim 1, wherein the selected direction defined by the longitudinal axis of a respective one of the lugs in the set of lugs is selected sequentially from a group of 0°, 45°, 90°, and 135° angles relative to a longitudinal axis of the set of lugs.

9. A floor mat that resists mat creep movement during use for mat purposes, comprising:
- a rubber sheet having a first side and an opposing second side;
- a field of a plurality of lugs extending in spaced-apart relation from the second side of the sheet;
- each lug comprising:
  - a first nib and a second nib each having a concave face and spaced-apart to define a passage therebetween with a longitudinal axis in a selected direction of a plurality of directions and said selected direction different from the direction of the longitudinal axis of the passage in an adjacent lug, the passage defined by a respective one of the lugs is free of a portion of the passage of an adjacent one of the lugs, each nib having a planar free distal end for bearing against a floor surface, the first and second nibs disposed in spaced-apart relation with the respective concave face open towards the opposing respective concave face such that a radial line extending from a center point of one of the first and second nibs intersects a center point of the opposing one of the first and second nibs,
- whereby the mat, being loaded relative to the surface, transfers loading forces to at least some of the plurality of lugs and a displacing movement of one lug relative to the surface in a movement direction is cooperatively resisted by at least adjacent lugs induced by respective loading to move in respective other directions, so that the mat resists movement under the loading during use of the mat for mat purposes on the floor surface.

10. The floor mat as recited in claim 9, wherein the lugs are C-shaped.

11. The floor mat as recited in claim 9, further comprising a fiber layer laminated to the first side of the sheet.

12. The floor mat as recited in claim 9, wherein the concave face is defined by a first radius and an opposing side defined by a convex face having a second radius.

13. The floor mat as recited in claim 12, wherein the first radius is about 0.09765 inches and the second radius is about 0.1953 inches and adjacent lugs are spaced on about 0.4883 inch centers.

14. The floor mat as recited in claim 9, wherein the nibs extend about 0.0625 inches from the second side of the sheet.

15. The floor mat as recited in claim 9, wherein a first row of the lugs is laterally offset relative to a second adjacent row of the lugs.

16. The floor mat as recited in claim 9, wherein the directions in the plurality of directions differ sequentially by a preselected number of degrees, whereby the selected direction of a respective one of the lugs differs by the preselected number of degrees from the selected direction of an adjacent lug.

17. The floor mat as recited in claim 9, wherein the selected direction defined by the longitudinal axis of a respective one of the lugs in the set of lugs is selected sequentially from a group of 0°, 45°, 90°, and 135° angles relative to a longitudinal axis of the set of lugs.

18. The floor mat as recited in claim 9, wherein the nibs extend about 0.0625 inches from the second side of the sheet.

19. A molded rubber floor mat that resists mat creep movement during use for floor mat purposes on a floor surface, comprising:
- a rubber sheet having a first side and an opposing second side;
- a plurality of sets of a plurality of lugs, the lugs in each set longitudinally aligned and spaced-apart from an adjacent lug in the respective set, and each set of lugs off-set from an adjacent set of lugs;
- each lug comprising:
  - a first and second arcuate-shaped nib extending from the second side to a respective planar free distal end in a plane parallel to the second side for bearing against a floor surface, the first and second nib spaced-apart to define a passage therebetween with a longitudinal axis in a selected direction of a plurality of directions to define a respective directional characteristic of the lug and said selected direction different from the selected direction of the longitudinal axis of the passage in an adjacent lug, the first and second nibs disposed with a respective concave face open towards the opposing respective concave face such that a radial line extending from a center point of one of the pair of nibs intersects a center point of the opposing one of the nibs, the lugs spaced apart such that the passage defined by a respective lug is free of a portion of the passage of an adjacent lug;
- whereby, the mat, being loaded relative to the floor surface, transfers loading forces to at least some of the plurality of lugs and a displacing movement of one lug relative to the floor surface in a movement direction is cooperatively resisted by at least adjacent lugs induced by respective loading to move in respective other directions based on the respective differing directional characteristics, so that the mat resists creep movement relative to the floor surface during use of the mat for mat purposes.

20. The floor mat as recited in claim 19, further comprising a fiber layer laminated to the first side of the sheet.

21. The floor mat as recited in claim 19, wherein the concave face is defined by a first radius and an opposing side defined by a convex face having a second radius.

22. The floor mat as recited in claim 21, wherein the first radius is about 0.09765 inches and the second radius is about 0.1953 inches and adjacent lugs are spaced on about 0.4883 inch centers.

23. The floor mat as recited in claim 19, wherein the nibs extend about 0.0625 inches from the second side of the sheet.

24. The floor mat as recited in claim 19, wherein a first row of the lugs is laterally offset relative to a second adjacent row of the lugs.

25. The floor mat as recited in claim 19, wherein the directions in the plurality of directions differ sequentially by a preselected number of degrees, whereby the selected direction of a respective one of the lugs differs by the preselected number of degrees from the selected direction of an adjacent lug.

26. The floor mat as recited in claim 19, wherein the selected direction defined by the longitudinal axis of a respective one of the lugs in the set of lugs is selected sequentially from a group of 0°, 45°, 90°, and 135° angles relative to a longitudinal axis of the set of lugs.

* * * * *